United States Patent
Ihrke et al.

(10) Patent No.: US 8,443,694 B2
(45) Date of Patent: May 21, 2013

(54) ROTARY SERIES ELASTIC ACTUATOR

(75) Inventors: Chris A. Ihrke, Hartland, MI (US); Joshua S. Mehling, League City, TX (US); Adam H. Parsons, Tulsa, OK (US); Bryan Kristian Griffith, Webster, TX (US); Nicolaus A. Radford, League City, TX (US); Frank Noble Permenter, Webster, TX (US); Donald R. Davis, Brighton, MI (US); Robert O. Ambrose, Houston, TX (US); Lucien Q. Junkin, Houston, TX (US)

(73) Assignees: GM Global Technology Operations LLC, Detroit, MI (US); The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 13/552,965

(22) Filed: Jul. 19, 2012

(65) Prior Publication Data

US 2012/0279343 A1 Nov. 8, 2012

Related U.S. Application Data

(62) Division of application No. 12/564,090, filed on Sep. 22, 2009, now Pat. No. 8,291,788.

(51) Int. Cl.
*B25J 17/00* (2006.01)
*B25J 17/02* (2006.01)
*B25J 18/00* (2006.01)

(52) U.S. Cl.
USPC ............................. 74/490.05; 901/27; 901/28

(58) Field of Classification Search
USPC .......... 74/411, 421 A, 421 R, 490.05, 490.06; 901/9, 14, 19, 21, 27, 28
See application file for complete search history.

(56) References Cited

U.S. PATENT DOCUMENTS

| | | | |
|---|---|---|---|
| 5,650,704 A | 7/1997 | Pratt et al. | |
| 7,752,939 B2 * | 7/2010 | Ono | 74/490.03 |
| 2004/0036437 A1 | 2/2004 | Ito | |
| 2007/0105070 A1 | 5/2007 | Trawick | |
| 2008/0075561 A1 | 3/2008 | Takemura et al. | |
| 2008/0141813 A1 * | 6/2008 | Ehrat | 74/490.01 |
| 2010/0145510 A1 * | 6/2010 | Ihrke et al. | 700/245 |

FOREIGN PATENT DOCUMENTS

| | | |
|---|---|---|
| JP | 61015546 A | 1/1986 |
| JP | 0215282 U | 1/1990 |
| JP | 10270110 A | 10/1998 |
| JP | 11247882 A | 9/1999 |

OTHER PUBLICATIONS http://robotics.nasa.gov/courses/fall2002/event/oct1/NASA_Robotics_20021001.htm.

* cited by examiner

*Primary Examiner* — Justin Krause
(74) *Attorney, Agent, or Firm* — Quinn Law Group, PLLC

(57) ABSTRACT

A rotary actuator assembly is provided for actuation of an upper arm assembly for a dexterous humanoid robot. The upper arm assembly for the humanoid robot includes a plurality of arm support frames each defining an axis. A plurality of rotary actuator assemblies are each mounted to one of the plurality of arm support frames about the respective axes. Each rotary actuator assembly includes a motor mounted about the respective axis, a gear drive rotatably connected to the motor, and a torsion spring. The torsion spring has a spring input that is rotatably connected to an output of the gear drive and a spring output that is connected to an output for the joint.

10 Claims, 4 Drawing Sheets

ROTARY SERIES ELASTIC ACTUATOR

CROSS REFERENCE TO RELATED APPLICATIONS

This application is a divisional of and claims the benefit of priority from U.S. application Ser. No. 12/564,090, filed Sep. 22, 2009, which is hereby incorporated by reference in its entirety.

STATEMENT REGARDING FEDERALLY SPONSORED RESEARCH OR DEVELOPMENT

This invention was made with government support under NASA Space Act Agreement number SAA-AT-07-003. The government may have certain rights in the invention.

TECHNICAL FIELD

The present invention relates to the motion control of a humanoid robot, and more specifically an actuation system and packaging for an upper arm of the humanoid robot.

BACKGROUND OF THE INVENTION

Robots are automated devices that are able to manipulate objects using a series of rigid links, which in turn are interconnected via articulations or motor-driven robotic joints. Each joint in a typical robot represents an independent control variable, also referred to as a degree of freedom (DOF). End-effectors are the particular links used for performing a task at hand, e.g., grasping a work tool or an object. Therefore, precise motion control of a robot may be organized by the level of task specification: object level control, i.e., the ability to control the behavior of an object held in a single or cooperative grasp of a robot, end-effector control, and joint level control. Collectively, the various control levels cooperate to achieve the required robotic mobility, dexterity, and work task-related functionality.

Humanoid robots in particular are robots having an approximately human structure or appearance, whether a full body, a torso, and/or an appendage, with the structural complexity of the humanoid robot being largely dependent upon the nature of the work task being performed. The use of humanoid robots may be preferred where direct interaction is required with devices or systems that are specifically made for human use. Due to the wide spectrum of work tasks that may be expected of a humanoid robot, different control modes may be simultaneously required. For example, precise control must be applied within the different spaces noted above, as well control over the applied torque or force, motion, and the various grasp types.

In order to approximate human movement each joint within the robot requires at least one actuator for each DOF. Additionally, these actuators must be packaged in an arrangement that approximately represents human structure and appearance.

SUMMARY OF THE INVENTION

Accordingly, rotary actuator assembly is provided herein for actuation of an upper arm assembly for a dexterous humanoid robot. The rotary actuator assembly includes a support frame defining an axis and a motor mounted about the axis within the support frame. A gear drive is rotatably connected to the motor and is also mounted within the support frame about the axis. A torsion spring includes a spring input and a spring output. The spring input is rotatably connected to an output of the gear drive and the spring output is connected to a joint output. The torsion spring is mounted within the support frame.

An upper arm assembly for the humanoid robot includes a plurality of arm support frames each defining an axis. A plurality of rotary actuator assemblies are each mounted to one of the plurality of arm support frames about the respective axes. Each rotary actuator assembly includes a motor, a gear drive rotatably connected to the motor, and a torsion spring. The torsion spring has a spring input that is rotatably connected to an output of the gear drive and a spring output that is connected to an output for the actuator assembly.

The above features and advantages and other features and advantages of the present invention are readily apparent from the following detailed description of the best modes for carrying out the invention when taken in connection with the accompanying drawings.

DESCRIPTION OF THE PREFERRED EMBODIMENT

Figure 1:
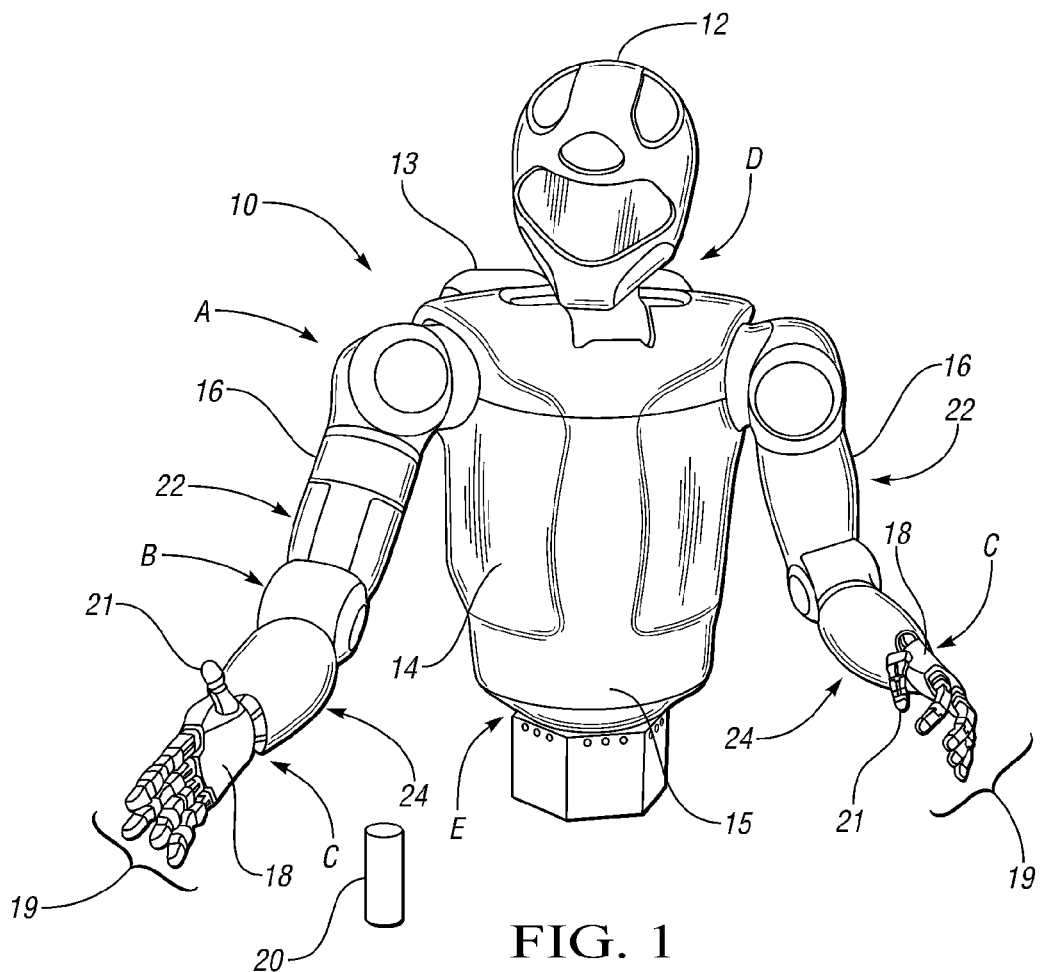
FIG. 1 is a schematic perspective illustration of a dexterous humanoid robot in accordance with the invention.

With reference to the drawings, wherein like reference numbers refer to the same or similar components throughout the several views, FIG. 1 shows a dexterous humanoid robot 10 adapted to perform one or more tasks with multiple degrees of freedom (DOF).

The humanoid robot 10 may include a head 12, torso 14, waist 15, arms 16, hands 18, fingers 19, and thumbs 21, with the various joints being disposed within or therebetween. The robot 10 may also include a task-suitable fixture or base (not shown) such as legs, treads, or another moveable or fixed base depending on the particular application or intended use of the robot. A power supply 13 may be integrally mounted to the robot 10, e.g., a rechargeable battery pack carried or worn on the back of the torso 14 or another suitable energy supply, to provide sufficient electrical energy to the various joints for movement of the same.

According to one embodiment, the robot 10 is configured with a plurality of independently and interdependently-moveable robotic joints, such as but not limited to a shoulder joint assembly (arrow A), an elbow joint assembly (arrow B), a wrist joint assembly (arrow C), a neck joint assembly (arrow D), and a waist joint assembly (arrow E), as well as the various finger joint assemblies (not numbered) positioned between the phalanges of each robotic finger 19.

Each robotic joint may have one or more DOF. For example, certain joints such as the shoulder joint assembly (arrow A) and elbow joint assembly (arrow B) may have at least two DOF in the form of pitch and roll. Likewise, the neck joint assembly (arrow D) may have at least three DOF, while the waist and wrist assemblies (arrows E and C, respectively) may have one or more DOF. Depending on task complexity, the robot 10 may move with over 40 DOF. Although not shown in FIG. 1 for simplicity, each robotic joint contains and is driven by one or more actuators, e.g., joint motors, linear actuators, rotary actuators, and the like.

The arm 16 is divided into an upper arm 22 and a lower arm (or forearm) 24. The upper arm 22 extends from the shoulder joint assembly (arrow A) to the elbow joint assembly (arrow B). Extending from the elbow joint (arrow B) is the lower arm 24, hands 18, fingers 19, and thumbs 21. For the purpose of simplification, as described herein, the upward direction is toward the head 12 and the downward direction is toward the waist 15. Those skilled in the art will appreciate that since the robot 10 is intended to simulate a humanoid, the various extremities—e.g., the arms 16 including upper arms 22, lower arms 24, and hands 18, etc.—will be symmetrical and essentially include an identical symmetrical skeletal structure on both the left and right sides. Therefore, when viewed frontally, as in FIG. 1, the right arm 16 and right hand 18 will actually be on the left of the drawing.

Figure 2:
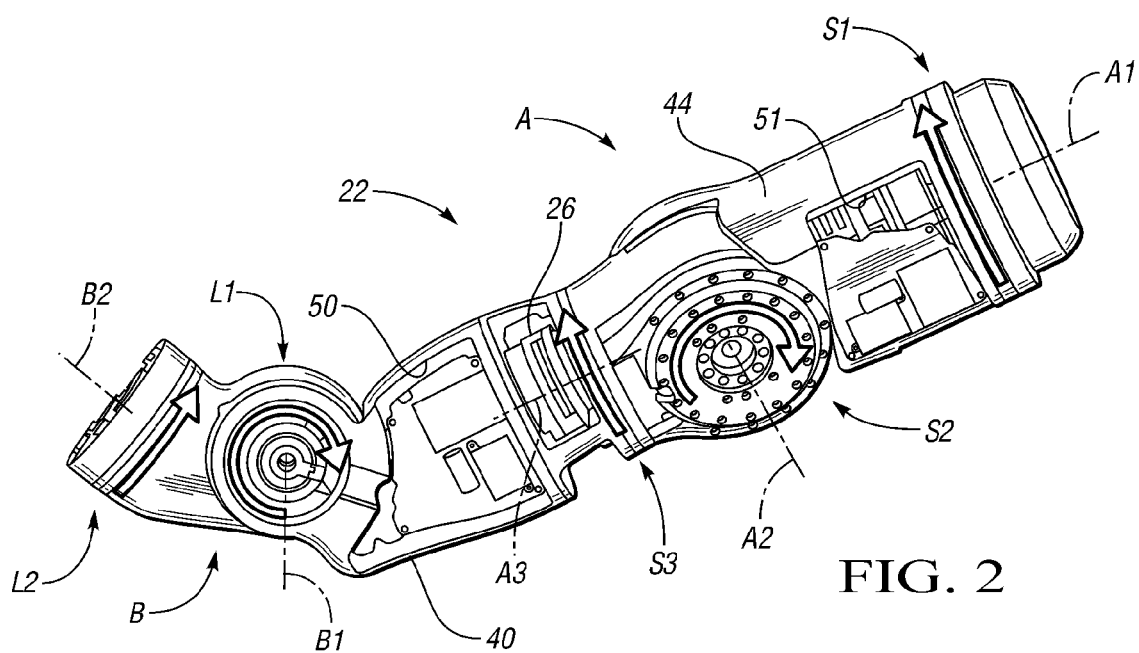
FIG. 2 is schematic perspective illustration of an upper arm for the dexterous humanoid robot of FIG. 1.

Referring to FIG. 2, the upper arm 22 is illustrated. Although only one upper arm 22 for the arms 16 is shown, both the left and the right arms 16 operate in the same manner as described below. The upper arm 22 has a shoulder joint assembly (arrow A) that includes a first shoulder joint S1 providing a first DOF, and second shoulder joint S2 providing a second DOF, and a third shoulder joint S3 providing a third degree of freedom. Together the first through third shoulder joints S1, S2, S3 perform the movements that represent the movements a human shoulder can perform. Specifically, rotation of the first shoulder joint S1 about a first shoulder axis A1 moves a second shoulder axis A2 for the second shoulder joint S2 into a desired position. Based upon the position of the first shoulder joint S1, rotation of the second shoulder joint S2 about the second shoulder axis A2 then moves the arm 16 up and down relative to the torso 14, or forward and backward relative to the torso 14 or some combination thereof. The third shoulder joint S3 rotates the upper arm 22 about a third shoulder axis A3. Rotation of the third shoulder joint S3 rotates the upper arm 22 axially, i.e. rotation of the third shoulder joint S3 rotates the elbow joint assembly (arrow B) to face upwards or downwards. Therefore, together the first shoulder joint S1, the second shoulder joint S2, and the third shoulder joint S3 perform the motions of a shoulder joint assembly (arrow A).

The upper arm 22 also includes an elbow joint assembly (arrow B), which includes a first elbow joint L1 and a second elbow joint L2. The first elbow joint L1 and the second elbow joint L2 each provide a degree of freedom. Together the first elbow joint L1, and the second elbow joint L2 perform the movements that represent the movements that a human elbow and forearm can perform. Rotation of the first elbow joint L1 about a first elbow axis B1 causes the upper arm 22, below the elbow joint assembly (arrow B) to bend and straighten. Additionally, rotation of the second elbow joint L2 about a second elbow axis B2 causes the upper arm 22, below the elbow joint assembly (arrow B) to rotate axially, i.e. rotation of the second elbow joint L2 about the second elbow axis B2 rotates the lower arm 24 and hand 18 (FIG. 1) to face palm up or down.

Each of the upper arm joints S1, S2, S3, L1, L2 operate in the same manner but are oriented in different directions, as shown, to rotate about their specific axes A1, A2, A3, B1, B2 respectively. The upper arm joints S1, S2, S3, L1, L2 each includes a rotary series elastic actuator assembly 26. The rotary series elastic actuator assembly 26 for each of the upper arm joints S1, S2, S3, L1, L2 may be sized according to the packaging, torque, and power requirements at that joint. In the embodiment shown, the first shoulder joint S1 and the second shoulder joint S2 are the same size and capacity as one another, the third shoulder joint S3 and the first elbow joint L1 are the same size and capacity as one another, and the second elbow joint L2 is another size and capacity. The packaging for the arm 16, including the actuator assembly 26, is such that the overall weight of the arm is less than the payload the arm is capable of manipulating.

As explained below, each of the upper arm joints S1, S2, S3, L1, L2 can operate by rotating in either clockwise or counter-clockwise about their respective axes A1, A2, A3, B1, B2. Additionally, the waist joint assembly (arrow E) may also include a rotary series elastic actuator assembly 26 and operate in the same manner as described herein.

Figure 3:
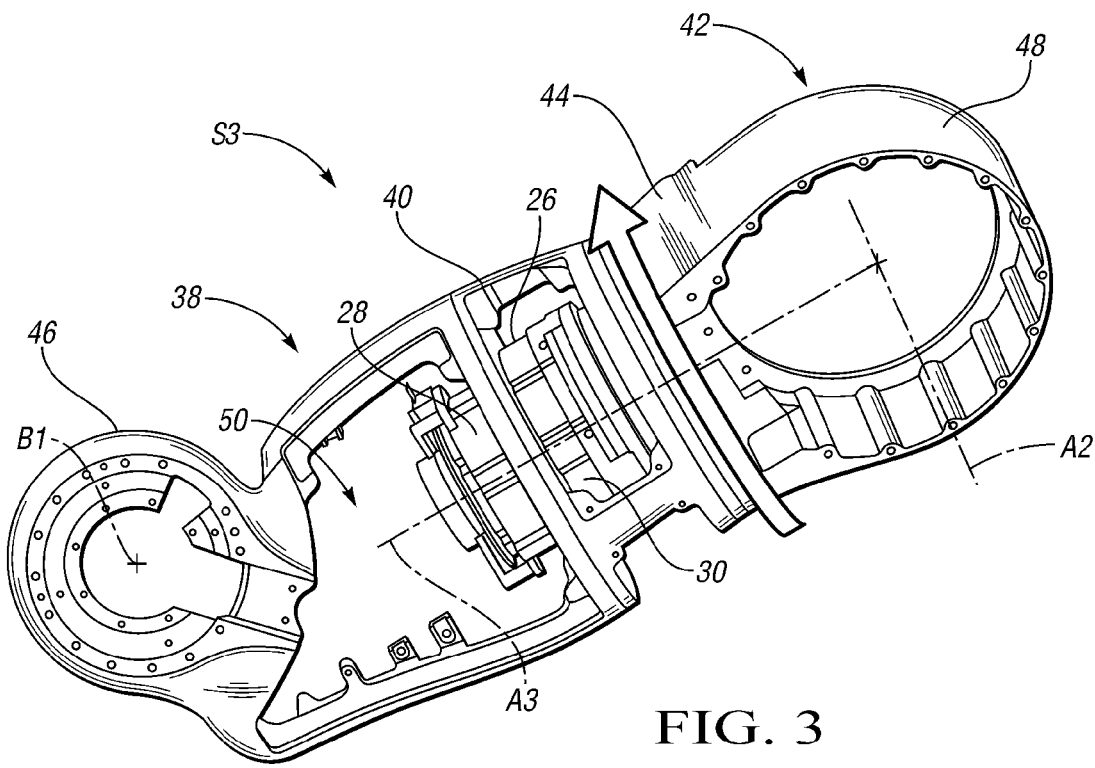
FIG. 3 is schematic perspective illustration of a support frame and rotary actuator assembly for one joint of the upper arm for the dexterous humanoid robot of FIGS. 1 and 2.
Figure 4:
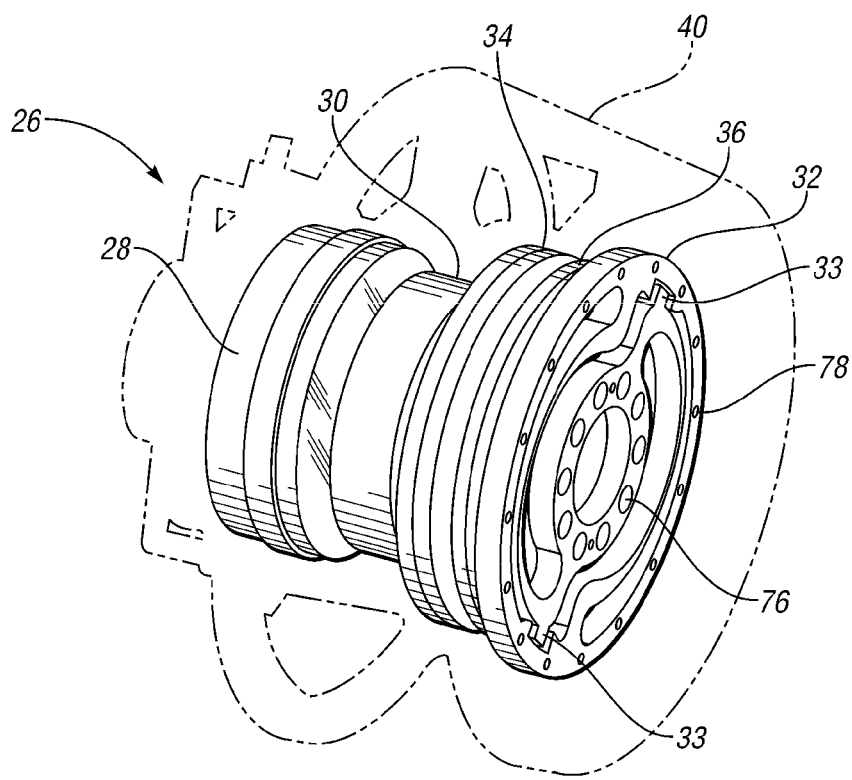
FIG. 4 is a schematic perspective illustration of a rotary actuator assembly for the upper arm of the dexterous humanoid robot of FIG. 1-3.

Referring to FIGS. 3 and 4 the actuator assembly 26 for the third shoulder joint S3 is illustrated. Operation of the actuators 26 is explained with respect to the third shoulder joint S3, although the actuators 26 for each of the other upper arm joints S1, S2, L1, L2 and the waist joint assembly (arrow E) operate in the same manner.

The actuator assembly 26 includes a motor 28, a gear drive 30, and a spring 32. A first absolute position sensor (APS) 34 and a second APS 36 are located between the gear drive 30 and the spring 32. The actuator assembly 26 is supported on a first arm support frame 40. Torque can be transferred through the actuator assembly 26 in either direction. Therefore, for the purpose of description, the joint "output" is labeled as the spring 32 end of the actuator assembly 26. The first arm support frame 40 is described as the "stationary" portion of the joint and the joint "output" at the spring 32 is described as the "rotational" portion of the actuator assembly 26. However, in practice, the joint "output" may be held stationary and the relative rotation by the actuator assembly 26 may rotate the joint "input". In the embodiment shown, holding the joint "output" stationary for the third should joint would cause the first arm support frame 40 to rotate and move the elbow joint assembly (arrow B) to face up or down.

The first arm support frame 40 is rigidly secured on an input side 38 of the actuator assembly 26. A second arm support frame 44 is rotatably connected on an output side 42 of the actuator assembly 26. The first arm support frame 40 and the second arm support frame 44 rotate relative to one another during operation of the third shoulder joint S3. In addition to supporting the input side 38 for the third shoulder joint S3, the first arm support frame 40 also supports an input 46 for the first elbow joint L1 and the rotatable second arm frame portion 44 is connected to an output 48 for the second shoulder joint S2.

A cavity 50 is defined by the first arm support frame 40. The cavity 50 is used for the circuit boards and wiring (not shown) for the third shoulder joint S3 and the first elbow joint L1. Because torque can be transferred through the actuators 26 in either direction (input to output or output to input) the orientation of the actuator assembly 26 can be arranged in either direction. Therefore, adjacently positioned joints (in the embodiment shown the third shoulder joint S3 and the first elbow joint L1) may be arranged to have facing joint inputs 38 and 46. In this manner, the circuitry and wiring for multiple joints (the third shoulder joint S3 and the first elbow joint L1)

may easily be located in one cavity 50. Likewise, the second shoulder joint S2 will have an output portion (i.e. the spring 32 end of the joint) facing the output of third shoulder joint S3 and the input portion facing the first shoulder joint S1. The circuitry and wiring for the first shoulder joint S1 and the second shoulder joint S2 are located in a cavity 51 defined by the second arm support frame 44 (shown in FIG. 2).

The spring 32 is a planar torsion spring that includes at least one hard stop 33. The hard stop 33 limits the available deflection of the spring 32 to prevent plastic deformation of the spring 32. In the embodiment shown the hard stop 33 allows up to 5 degrees of spring deflection. Spring deflection may occur due to the weight of the arm 16 or force input from the object 20 in the environment (shown in FIG. 1). A spring input 76 is located at an inner bolt circle for the spring 32 and a spring output 78 is located at an outer bolt circle for the spring 32.

Figure 5:
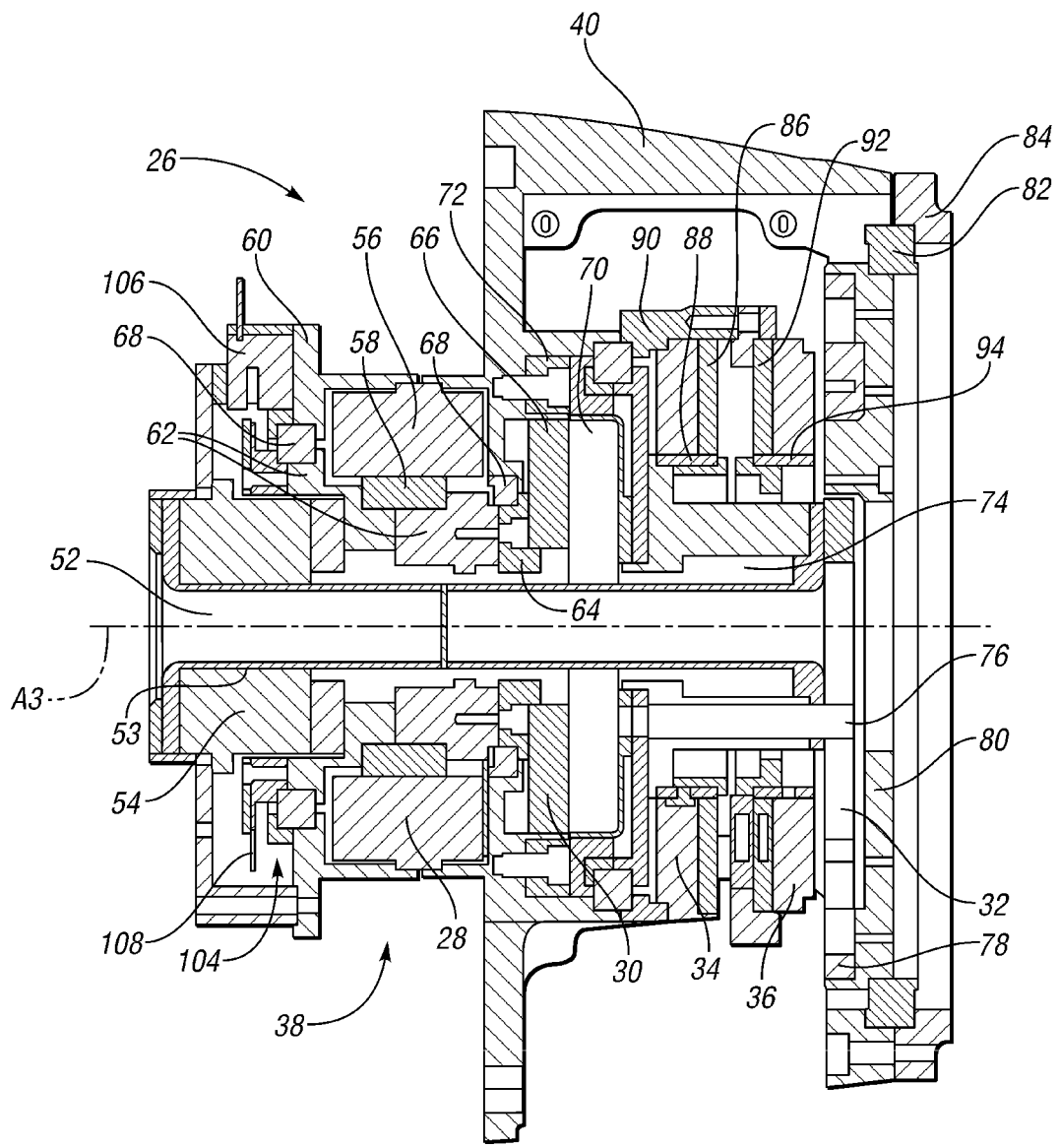
FIG. 5. is a schematic cross-sectional illustration of the rotary series elastic actuator assembly for the dexterous humanoid robot of FIG. 1-4

FIG. 5 is a cross-sectional schematic illustration of the actuator assembly 26. The actuator assembly 26 is mounted around the third shoulder axis A3. A tube 53 defines an internal wire channel 52 which is arranged concentrically about the third shoulder axis A3. The internal wire channel 52 allows for wiring for shoulder joint S3 and subsequent joints to pass through the actuator assembly 26 into the cavity 50 (shown in FIG. 3).

As mentioned above, the actuator assembly 26 includes the motor 28, the gear drive 30 and the spring 32. The motor 2828 has a brake 54 nested within the motor 2828 to reduce the packaging area required for the actuator assembly 26 motor 28. The motor 2828 includes a stator 56 and a rotor 58. The stator is secured to the first arm support frame 40 with a stationary motor support 60. The rotor 58 is rotatably supported and centered with rotor supports 62. A motor output 64 connects the rotor 58 with a gear drive input 66 for the gear drive 30. A plurality of motor bearings 68 assist rotation of the rotor 58, the rotor supports 62, the motor output 64 and the gear drive input 66 relative to the first arm support frame 40.

The gear drive 30 is preferably a harmonic drive gear set. The gear drive 30 includes a gear drive input 66, a gear drive output 70, and a stationary spline 72. The gear drive's stationary spline 72 is rigidly secured to the first arm support frame 40. The gear drive output 70 is secured to a gear drive output shaft 74 which is secured to a spring input 76. Torque from the gear drive output shaft 74 is transferred through the spring input 76 to a spring output 78. The spring output 78 is attached to a joint output 80. The joint output 80 is connected (not shown) to the output 48 for the second shoulder joint S2 to transfer torque from the third shoulder joint S3 to the second shoulder joint S2.

An output bearing 82 is located between the joint output 80 and the first arm support frame 40 to allow relative rotation between the joint output 80 and the first arm support frame 40. A bearing retainer 84 may be clamped to the first arm support frame 40 to assist in securing the bearing 82 on the first arm support frame 40.

Referring back to FIG. 5, the first APS 34 and the second APS 36 sense the relative movements of the actuator assembly 26. The first APS 34 includes a first stationary portion 86 and a first rotary portion 88. The first stationary portion 86 is attached to the first arm support frame 40 with a support 90 and the first rotary portion 88 attached to the gear drive output shaft 74. The first APS 34 senses the position of the gear drive 30 based upon the relative positions of the first stationary portion 86 and the first rotary portion 88.

Likewise, the second APS 36 includes a second stationary portion 92 and a second rotary portion 94. The second stationary portion 94 is attached to the first arm support frame 40 through the support 90. The second rotary portion 94 is attached to the joint output 80. The second APS 36 senses the position of the third shoulder joint S3 output based upon the relative positions of the second stationary portion 92 and the second rotary portion 94. Additionally, by calculating the difference between the first APS 34 and the second APS 36 the spring 32 deflection can be determined. By multiplying the deflection of the spring 32 by the spring rate the torque experienced by the third shoulder joint S3 can be calculated. The first APS 34 and the second APS 36 provide a high measurement resolution to tightly determine the torque measurements of the actuator assembly 26. Additionally, the use of two APS for providing torque measurements allows the actuator assembly 26 to account for any deflections of the spring 32 when moving the actuator output to a desired position.

Figure 6:
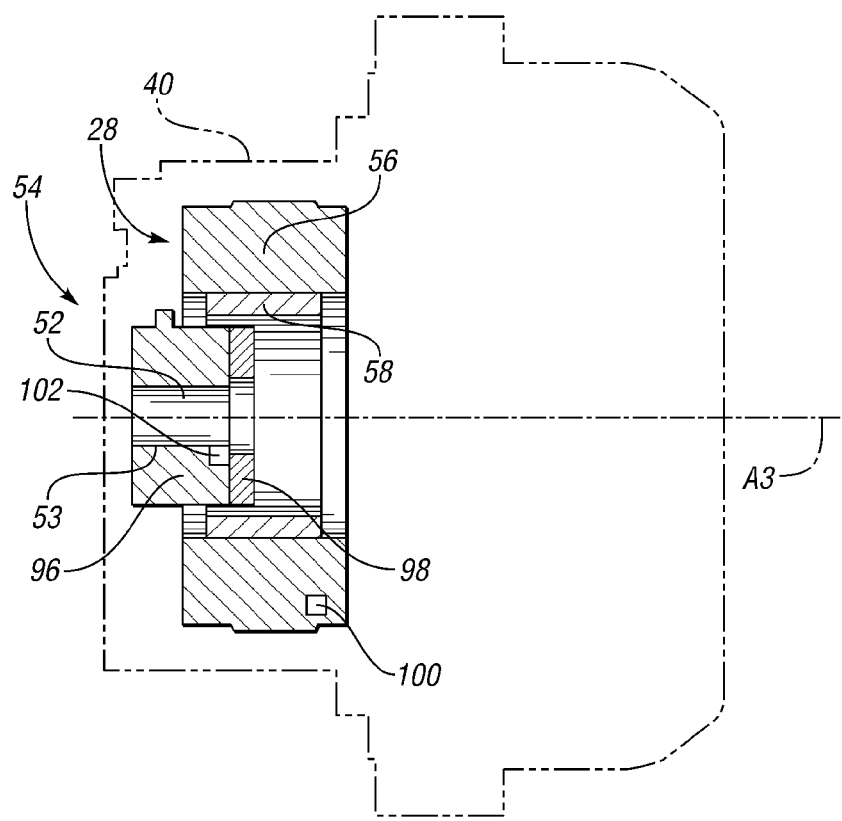
FIG. 6 is a schematic cross-sectional illustration of a motor and brake for the rotary actuator assembly for the dexterous humanoid robot of FIG. 1-5.

FIG. 6 is a schematic cross-sectional illustration of the motor 28. The motor 28 includes the stator 56 and the rotor 58. The brake 54 includes a brake coil 96 and brake pad 98. The motor 28 has a generally annular shape and is mounted around the third shoulder axis A3. The motor stator 56 and rotor 58 have inner diameters which are sufficiently large to allow the brake 54 to be positioned between the motor 28 and the wire channel 52.

Additionally, the motor 28 includes a first temperature sensor 100 and the brake 54 includes a second temperature sensor 102 to detect thermal conditions of the motor 28 and the brake 54 to prevent overheating of the motor 28 and the brake 54.

Figure 7:
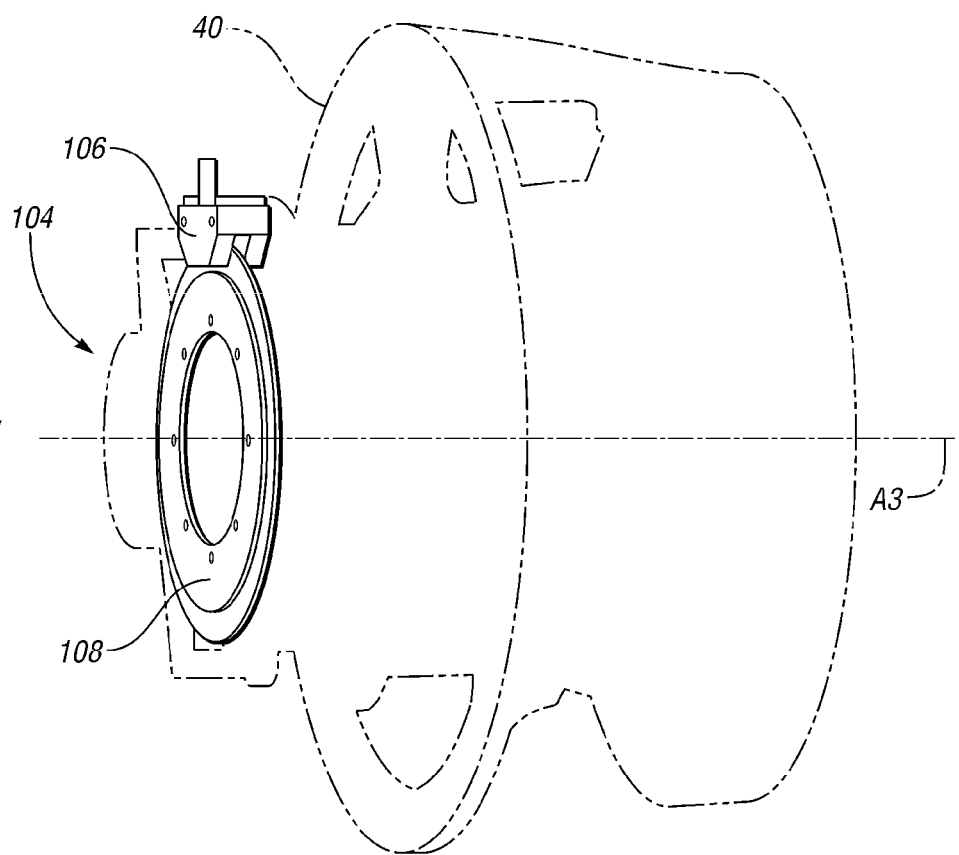
FIG. 7 is a schematic perspective view of a rotational position sensor for the rotary actuator assembly for the dexterous humanoid robot of FIG. 1-6.

FIG. 7 illustrates a rotational position sensor 104. The rotational position sensor 104 is preferably a position encoder that is positioned concentrically about the third shoulder axis A3 adjacent to the motor 28 and the brake 54. The rotational position sensor 104 includes a first stationary portion 106 mounted to the first arm support frame 40 and a second rotary portion 108 which rotates with the rotor 58. The first stationary portion 106 measures movement of the relative second rotary portion 108. In this manner, the rotational position sensor 104 acts to determine the rotary position of the rotor 58 of the third shoulder joint S3. This allows for measurement and compensation of any deflections observed in the gear drive 30 or other drive train components in between the rotor 58 and the first APS 34. The information from the first APS 34 (shown in FIGS. 4 and 5), the second APS 36 (shown in FIGS. 4 and 5) and the rotational position sensor 104 can be compared with one another as an additional safety measure. If a discrepancy is detected between the expected values of the first APS 34, the second APS 36 and the rotational position sensor 104, the joint can be prevented from moving to protect against damage to the third shoulder joint S3.

Therefore, five sensors including the first APS 34, the second APS 36, the first temperature sensor 100, the second temperature sensor 102 and the rotational position sensor 104 are packaged within and utilized by the actuator assembly 26.

While the best modes for carrying out the invention have been described in detail, those familiar with the art to which this invention relates will recognize various alternative designs and embodiments for practicing the invention within the scope of the appended claims

The invention claimed is:

1. An upper arm assembly for a humanoid robot comprising:
   a plurality of circular arm support frames each defining an axis;
   a plurality of rotary actuator assemblies, each mounted to one of the plurality of arm support frames about the respective axes and defining a joint; and wherein each rotary actuator assembly includes:
a motor mounted about the respective axis;
a gear drive rotatably connected to the motor;
a torsion spring disposed about the axis and having a spring input and a spring output; and
wherein the spring input is rotatably connected to an output of the gear drive and the spring output is connected to an output for the joint.

2. The upper arm assembly of claim 1, wherein the plurality of rotary actuator assemblies each define an actuator input on a motor side of the rotary actuator assembly and an actuator output on the spring side of the rotary actuator assembly, and wherein each of the plurality of rotary actuator assemblies can transfer torque from the actuator input to the actuator output and from the actuator output to the actuator input.

3. The upper arm assembly of claim 2, wherein the plurality of rotary actuator assemblies further includes:
a first rotary actuator assembly having a first input and a first output;
a second rotary actuator assembly having a second input and a second output, wherein the first input is connected to the second input;
a third rotary actuator assembly having a third input and a third output, wherein the third output is connected to the second output;
a fourth rotary actuator assembly having a fourth input and a fourth output, wherein the fourth input is connected to the third input; and
a fifth rotary actuator assembly having a fifth input and a fifth output, wherein the fifth input is connected to the fourth output.

4. The upper arm assembly of claim 3, further including:
a first arm support frame to support the first rotary actuator assembly and the second rotary actuator assembly;
a second arm support frame to support the third rotary actuator assembly and the fourth rotary actuator assembly; and
a third arm support frame to support the fourth rotary actuator assembly.

5. The upper arm assembly of claim 3, wherein the first arm frame support defines a first cavity and at least one wiring component for the first rotary actuator assembly and at least one wiring component for the second rotary actuator assembly located within the first cavity; and wherein the second arm frame support defines a second cavity and at least one wiring component for the third rotary actuator assembly and at least one wiring component for the fourth rotary actuator assembly located within the second cavity.

6. The upper arm assembly of claim 1, wherein each plurality of rotary actuator assemblies further includes:
a first absolute position sensor having a first stationary portion and a first rotary portion;
a second absolute position sensor having a second stationary portion and a second rotary portion;
wherein the first stationary portion and the second stationary portion are secured to the arm support frame;
wherein the first rotary portion is secured to the output of the gear drive to sense the rotational position of the gear drive output relative to the arm support frame;
wherein the second rotary portion is secured to the spring output to sense the rotational position of the joint output relative to the arm support frame; and
wherein the difference in the position of the first rotary portion and the second rotary portion is the amount of deflection of the torsion spring.

7. The upper arm assembly of claim 1, wherein the weight of the upper arm assembly is less than the weight the upper arm assembly is capable of manipulating.

8. The upper arm assembly of claim 1, wherein each plurality of rotary actuator assemblies further includes:
a brake mounted about the axis;
wherein the motor has a generally annular shape; and
wherein at least a portion of the brake is positioned within the annular opening between the motor and the axis.

9. The upper arm assembly of claim 1, wherein each plurality of rotary actuator assemblies further includes a tube mounted along the axis, and wherein the tube defines a wire channel centrally located within the motor.

10. The upper arm assembly of claim 9, wherein each plurality of rotary actuator assemblies further includes:
a first temperature sensor located within the motor;
a second temperature sensor located within the brake; and
a rotational sensor configured to measure a rotational position of the motor output.

* * * * *